United States Patent
Pipon (10) Patent No.: US 10,243,593 B2
(45) Date of Patent: Mar. 26, 2019

(54) METHOD OF COMBATTING INTERFERENCE BY SPATIAL FILTERING OR SPATIO-TEMPORAL FILTERING IN A MULTI-CHANNEL RECEIVER

(71) Applicant: THALES, Courbevoie (FR)

(72) Inventor: François Pipon, Gennevilliers (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/853,148

(22) Filed: Dec. 22, 2017

(65) Prior Publication Data
US 2018/0191382 A1    Jul. 5, 2018

(30) Foreign Application Priority Data

Dec. 29, 2016    (FR) .................................... 16 01894

(51) Int. Cl.
| | |
|---|---|
| H03H 7/30 | (2006.01) |
| H03H 7/40 | (2006.01) |
| H03K 5/159 | (2006.01) |
| H04B 1/00 | (2006.01) |
| H04B 1/10 | (2006.01) |
| H04B 7/08 | (2006.01) |
| H04L 25/02 | (2006.01) |

(52) U.S. Cl.
CPC ........... *H04B 1/005* (2013.01); *H04B 1/1081* (2013.01); *H04B 7/086* (2013.01); *H04B 7/0851* (2013.01); *H04B 7/0891* (2013.01); *H04L 25/022* (2013.01)

(58) Field of Classification Search
CPC .... H04B 1/005; H04B 7/0851; H04B 7/0891; H04B 7/0845
USPC ................................ 375/229, 231, 232, 350
See application file for complete search history.

(56) References Cited

U.S. PATENT DOCUMENTS

| | | | | |
|---|---|---|---|---|
| 6,118,832 A | * | 9/2000 | Mayrargue ........... | H04B 7/0845 375/229 |
| 6,243,415 B1 | * | 6/2001 | Pipon .................... | H04B 7/005 375/232 |

FOREIGN PATENT DOCUMENTS

| | | |
|---|---|---|
| EP | 0 665 665 A1 | 8/1995 |
| WO | 97/23061 A1 | 6/1997 |

\* cited by examiner

*Primary Examiner* — Phuong Phu
(74) *Attorney, Agent, or Firm* — Baker & Hostetler LLP (57) ABSTRACT

A method for receiving a signal and for rejecting interference in a multichannel receiver, comprises the steps of: reception, transposition and discretization of the signal received on each of the channels of the receiver, so as to obtain a discretized multichannel signal, synchronization of the discretized multichannel signal, computation, on the basis of the discretized and synchronized multichannel signal, of a matrix $\hat{R}$ of correlation of the total noise, computation, on the basis of the matrix $\hat{R}$ of correlation of the total noise, of a vector w comprising amplitude phase weighting coefficients of a multichannel filter, and application, to the discretized and synchronized multichannel signal, of a multichannel filtering processing on the basis of the vector w, and then of a single-channel equalization processing to the filtered signal.

11 Claims, 5 Drawing Sheets

METHOD OF COMBATTING INTERFERENCE BY SPATIAL FILTERING OR SPATIO-TEMPORAL FILTERING IN A MULTI-CHANNEL RECEIVER

CROSS-REFERENCE TO RELATED APPLICATIONS

This application claims priority to foreign French patent application No. FR 1601894, filed on Dec. 29, 2016, the disclosure of which is incorporated by reference in its entirety.

FIELD OF THE INVENTION

The invention lies in the field of antenna processing, and relates to a method of reception in a multichannel receiver, as well as to a receiver implementing the method. The invention applies to radiocommunications, in particular military radiocommunications, whatever the configuration (ground-ground, ground-air or air-air), with no limitation of employment relating to the frequency band, and more particularly in the HF band (the acronym standing for High Frequencies), UHF band (the acronym standing for Ultra High Frequencies), or the C band (from 4 GHz to 8 GHz). It applies in particular to radio transmissions for which a signal is received in the presence of interference, whether the latter is intentional or unintentional, when the receiver comprises several receive antennas.

BACKGROUND

During the propagation of a radioelectric signal, arising from the phase, frequency and/or amplitude modulation of a carrier by a string of symbols, the signal is subjected to several sources of degradations.

Among these sources of degradations is the noise intrinsic to the receiver, which can be modelled as Gaussian White Noise. When the signal is received on several sensors (or antennas), the noise is assumed to be white spatially (independence between the sensors) and temporally (independence in time) and the noise correlation matrix R can be written $R=\mathrm{diag}(\sigma_k^2)$, with $\sigma_k^2$ the noise power received on sensor k.

Among these sources of degradations are also the paths related to the multiple reflections of the electromagnetic wave during its propagation. These multi-paths are due to the reflections on the diverse elements of the environment, such as buildings or the terrestrial relief, but may also originate, as is often the case when dealing with HF transmissions, from reflections on the various ionospheric layers of the atmosphere. These reflections generate replicas of the signal that are shifted in time, in phase and/or in amplitude. When the multi-paths are received in a time interval that is less than the duration of a symbol, they may sum together in a constructive or destructive manner. One then speaks of flat fading, which, in order to improve the quality of reception, requires the implementation of techniques making it possible to impart diversity to the signal:

temporal diversity in case of mobility, obtained by way of an interleaving and of a coding of the data over a more significant duration than the coherence time of the propagation pathway, frequency diversity obtained by way of a frequency hopping and data coding mechanism, or spatial diversity obtained through the use of a plurality of judiciously spaced transmit and/or receive antennas.

When the multi-paths are received in a time interval greater than the duration of a symbol, they generate inter-symbol interferences which degrade the quality of the radio link: one then speaks of selective fading. To remedy this problem, it is necessary to resort to pathway coding techniques, making it possible to improve the robustness of the signal, to equalization techniques, seeking to estimate the propagation pathway and to recombine in time and in phase the various paths, or to antenna processing techniques, aimed at optimizing the reception of the various useful paths by recombining in an effective manner the signals arising from the various receive antennas.

Finally, among these sources of degradations are the interferences related to jamming, be it intentional (broadband deliberate jamming for example) or unintentional (other signals transmitted in the same frequency resource). Processings specific to the fight against jamming are then necessary, such as error-correcting coding, the excision of jammers by notch filtering, frequency evasion or else antenna processing techniques which are aimed at recombining the signals received on an array of sensors to eliminate the influence of the interferences while optimizing the reception of the useful signal.

Among the set of techniques making it possible to combat the various sources of degradations affecting the reception of a useful signal, antenna processing techniques, or multi-channel processings, are the most promising, since they make it possible, by processing the signals received on the various antennas of an array, to optimize the reception of the useful signal in the presence of flat fading, of selective fading and of interference.

Single-channel or SISO processings (the acronym standing for Single Input Single Output), such as pathway coding or equalization, exhibit their limits once the level of the interference becomes too significant or the propagation conditions are too complex (flat fading whilst the coherence band of the pathway is higher than the frequency hopping band, selective fading, the spreading of whose paths is too significant to be able to be equalized, broadband interferences, etc.). It is then necessary to combine them with multichannel processings, the exploitation of the spatial diversity afforded by the use of several antennas making it possible to profit from the difference between the transmission pathways relating to each antenna.

Among the multichannel processings are distinguished the processings for which the antenna diversity is afforded on transmission, called MISO processings (the acronym standing for Multiple Input Single Output), the processings for which the antenna diversity is afforded on reception, called SIMO processings (the acronym standing for Single Input Multiple Output), and the processings for which the antenna diversity is afforded at one and the same time on transmission and on reception, called MIMO processings (the acronym standing for Multiple Input Multiple Output).

The invention relates to SIMO processings.

In the absence of interference, various SIMO antenna processings can be envisaged as a function of the characteristics of the useful propagation pathway.

When the fading is "flat" (absence of intersymbols interference), the optimal SIMO processing is the so-called MRC processing (the acronym standing for Maximal Ratio-Combining). In an MRC multichannel receiving station, the signals arising from the various reception channels are recombined in phase and in amplitude, in such a way as to maximize the signal-to-noise ratio (SNR) of the useful signal. Thus, in the presence of spatially and temporally white noise (that is to say in the absence of interference), and for flat fading (absence of intersymbols interference), MRC processing allows optimal exploitation of the spatial diversity.

When the fading is "selective" in frequency (presence of intersymbols interference), the MRC receiver sees its performance deteriorate and the implementation of a multichannel equalization technique is necessary. Several multichannel equalization solutions have been proposed in the literature.

Some of these equalization solutions are termed "non anti-jammed", that is to say that they are designed to operate in the absence of jammers. The noise present on each of the channels is therefore temporally white, and uncorrelated between the channels (therefore spatially white).

Among these techniques, the optimal solution in the maximum likelihood sense is the receiver based on the Spatio-Temporal Matched Filter in Spatially and Temporally White Noise (STMF-STWN) followed by a decision unit based on a Viterbi algorithm. STMF-STWN consists in performing an estimation of the propagation pathway and then a matched filtering adapted to the propagation pathway on each of the reception channels, and then in summing the signals obtained at the output of the matched filters. On output from STMF-STWN, the signal-to-noise ratio is maximized on the current symbol and the residual inter-symbol interference is processed by a Viterbi algorithm. This receiver is optimal in the absence of interference, whether the fading is selective or whether it is flat.

However, the STMF-STWN performance is no longer satisfactory once the signal received contains interference which is not narrow-band interference. The implementation of other types of SIMO processings is then necessary.

To allow operation in the presence of interference, that is to say in a jammed environment for which the noise received on the various channels is no longer spatially white, so-called "anti-jammed" multichannel equalization schemes are known. These schemes integrate techniques specially dedicated to the fight against the interference related to jamming and noise that is not spatially white. They are also known by the name of antenna filtering techniques (under this rubric, an antenna is composed of several elementary antennas and the antenna filtering is aimed at recombining the signals arising from these various elementary antennas so as to optimize the reception of the useful signal in the presence of interference, or else of adaptive antenna techniques (to underline the fact that the processings are capable of adapting automatically to alterations in the conditions of propagation and of interference).

These techniques have been developed starting from the 1960s. Initially, they were based on spatial filtering (therefore without any notion of equalization) of the signals received, that is to say with an amplitude/phase weighting on each sensor. Then, starting from the 1980s/90s, spatio-temporal structures, allowing genuine multichannel equalization of the signals received, were proposed, so as to follow the evolution of the waveforms and the increase in the bandwidths of the modulations.

Thus, the simplest structure making it possible to combat interferences is a spatial structure whose complex weights on each of the sensors are adapted through a criterion for minimizing a Mean Square Error (MSE) between the antenna output signal and a replica signal. Such an antenna, dubbed SMFR (Spatial Matched Filter adapted with the aid of a Replica), allows the rejection of jammers, but in the presence of useful propagation multipaths:

it "points" in the direction of one of the paths (the one which is correlated with the replica), that is to say that it resets in phase the contributions of this path on the various sensors. When the antenna is composed of omnidirectional sensors, the expected gain in signal-to-noise ratio is of the order of 10 log K, where K is the number of sensors used, it seeks to reject the paths that are decorrelated from the path towards which it points (thus losing the energy associated with these paths), these being seen by the antenna as entirely separate jammers.

Such an antenna may therefore be heavily penalized in the presence of several useful propagation paths. Indeed, the rejection of the decorrelated useful paths may occur to the detriment of the rejection of the jammers, the performance of the multisensor receiver may even become worse than that of the single-sensor receiver when two temporally decorrelated propagation paths are very correlated spatially.

In order to improve the performance of the latter antenna processing technique, the idea is to couple it with a single-sensor equalization technique. One thus obtains multisensor equalizers comprising a spatial part, composed of various filters disposed on each of the reception channels, and a temporal part disposed at the output of the spatial part.

It is possible to cite in this regard European patent EP 0867079 B1, which seeks to carry out the spatial filtering of the signals received on the array of sensors, while optimizing a spatio-temporal criterion making it possible to preserve the whole set of useful paths. This filtering must therefore be followed by a step of equalizing a single-channel signal. The role of the spatial filtering is to recombine the signals received on the various channels, while rejecting the interference, if any, as well as the reflected paths whose delay is greater than the maximum delay corrected by the single-channel equalizer which follows it.

Among the single-channel equalization techniques usable at the output of the spatial filtering, the optimal solution in the maximum likelihood sense is based on a matched filtering adapted to the propagation pathway, implemented after a pathway estimation step, followed by a decision unit based on a Viterbi algorithm. On output from the pathway-matched filter, the signal-to-noise ratio is maximized on the current symbol (the various paths are recombined on the current symbol, in phase) and the residual inter-symbol interference is processed by a Viterbi algorithm.

The main drawback of this single-channel equalization technique stems from the fact that the Viterbi algorithm requires a computational power that grows as $M^L$, with M the order of the constellation and L the length of the estimated propagation pathway (measured in symbol times). Thus, this receiver can be envisaged on waveforms such as GSM (the acronym standing for Global System for Mobile communications), for which M=2 and L=5, but not on more recent waveforms, for which the modulation band is more significant and where the constellations are of higher order.

An alternative to the Viterbi algorithm, which is less expensive in terms of computational power, consists in implementing a single-channel equalizer at the output of the spatial filtering. The single-channel equalizer can be any type of equalizer known to the person skilled in the art, such as for example a DFE equalizer (the acronym standing for Decision Feedback Equalizer), BDFE equalizer (the acronym standing for Block-DFE), an FDE (Frequency Domain Equalization) equalizer, a transverse equalizer, or a turbo equalizer. These equalizers can be based on so-called ZF criteria (the acronym standing for Zero-Forcing), MMSE criteria (the acronym standing for Minimum Mean Square Error), MLSE criteria (the acronym standing for Maximum Likelihood Sequence Estimator), or other criteria.

In patent EP 0867079 B1, to carry out the spatial filtering of the multichannel signal received, a vector w, composed of one coefficient per channel, is used during a step of antenna processing and of recombining of the channels defining a temporal filter applied to the training sequence. This vector w is computed, jointly with a vector v in such a way as to minimize the mean square error between the output signal of the spatial part, corresponding to the signal filtered by w, and the output signal of the temporal part, corresponding to the training sequence filtered by v. The vector v is a computation intermediary making it possible to compute the vector w.

Two constraints are envisaged in computing the vectors w and v. The first constraint is a norm constraint which makes it possible to optimize the spatial filter when the equalizer placed at output is an equalizer based on the Viterbi algorithm (the computed spatial filter optimizes the global signal-to-noise over interference ratio (or SNIR, standing for Signal over Noise plus Interference Ratio) associated with all the paths), while the second constraint is a pointing constraint which makes it possible to optimize the spatial filter when the equalizer placed at output is of the MMSE type (the computed spatial filter optimizes the SNIR associated with the main path so as to favour the operation of the equalizer placed at output).

Patent EP 0867079 B1 exhibits a certain number of drawbacks, however. The main ones are the following:
the implementation of the antenna processing requires the inversion of matrices, an operation which is very expensive in terms of computation time. Some of these matrices are computed on the basis of known training sequences, and can be precomputed upstream, and then stored in memory, correspondingly decreasing the required computational power. However, the size of these matrices is significant and their storage may pose a problem as the number of matrices to be stored increases. Such is the case in particular in applications aimed at decreasing the signature of the waveform by using a large number of different training sequences.
the algorithms described make it necessary to take a temporal reference $i_0$, chosen as corresponding to the path of strongest power, determined during an upstream synchronization phase. This criterion therefore considers only a single one of the paths, and is not necessarily the optimal choice criterion.
the performance related to the spatial filtering may be improved, by modifying the way in which the coefficients of this filtering are computed so as not to reject the paths situated in the window of the single-channel filtering. Moreover, the spatial filtering can be afforded an additional temporal dimension so as to allow it to attenuate multi-paths situated outside of the window of the equalizer and/or to place in phase multiple paths situated in the horizon of the equalizer, and to correct mispairings between the channels of the receiver.

SUMMARY OF THE INVENTION

The invention is therefore aimed at solving all or some of the aforementioned drawbacks, and at proposing an implementation which is at one and the same time efficacious, and inexpensive in terms of computational power and memory space required.

In this regard, the invention pertains to a method for receiving a signal and for rejecting interference in a multichannel receiver. This method comprises the steps of:

reception, transposition and discretization of the signal received on each of the channels of the receiver, so as to obtain a discretized multichannel signal,
synchronization of the discretized multichannel signal,
computation, on the basis of the discretized and synchronized multichannel signal, of a matrix $\hat{R}$ of correlation of the total noise,
computation, on the basis of the said matrix $\hat{R}$ of correlation of the total noise, of a vector w comprising amplitude phase weighting coefficients of a multichannel filter, and
application, to the discretized and synchronized multichannel signal, of a multichannel filtering processing on the basis of the said vector w, and then of a single-channel equalization processing to the filtered signal.

The computation of the matrix $\hat{R}$ of correlation of the total noise received on the set of channels of the receiver can be carried out on the basis:
of a matrix $\hat{R}_{XX}$ of autocorrelation of the discretized and synchronized multichannel signal received,
of a matrix $\hat{R}_{XD}$ of intercorrelation between a training sequence and the discretized and synchronized multichannel signal received,
of a matrix $\hat{R}_{DD}$ of autocorrelation of the said training sequence,
according to the formula:

$$\hat{R} = \hat{R}_{XX} - \hat{R}_{XD}{}^H \hat{R}_{DD}{}^{-1} \hat{R}_{DX}.$$

Advantageously, the inverse of the matrix $\hat{R}_{DD}$ is precomputed and stored in a memory of the multichannel receiver.

The computation of the vector w comprising amplitude phase weighting coefficients to be applied to each of the channels in the multichannel filtering part comprises:
the computation of $r_{xd}(i_0)$, $r_{xd}(i_0)$ being the mathematical expectation of the correlation between a training sequence and the multichannel signal received affected with a delay $i_0$,
the computation of $\hat{w}$ according to the formula $\hat{w} = \hat{R}^{-1} r_{xd}(i_0)$.

According to one embodiment, the delay $i_0$ is determined with respect to the position of the path of strongest power. According to another embodiment, it is determined with respect to the position which maximizes the signal-to-noise plus interference ratio at the output of the multichannel filtering. This position is obtained through the formula:

$$i_0 = \text{ArgMax}_i \{ \text{SNIR}(i) = \hat{r}_{xd}(i)^H \hat{R}^{-1} \hat{r}_{xd}(i) \}.$$

Advantageously, the said single-channel equalization is carried out on the basis of an estimation of the single-channel propagation pathway g given by the formula $g = w^H \hat{H}$, where $\hat{H}$ is a multisensor pathway matrix estimated according to the formula $\hat{H} = \hat{R}_{XD} R_{DD}{}^{-1}$.

According to one embodiment of the method according to the invention, the multichannel filtering is a spatial filtering. According to another embodiment, the multichannel filtering is a spatio-temporal filtering. In this case, the method furthermore comprises a step of determining at least one delay $\tau_j$ associated with a multiple path j of the signal received, and a step of forming a spatio-temporal multichannel signal vector on the basis of the said discretized and synchronized signal and of the said discretized and synchronized signal delayed by the said delay or delays $\tau_j$. The steps of computing a matrix $\hat{R}$ of correlation of the total noise, and of applying a multichannel filtering processing then take as input the said spatio-temporal multichannel signal instead of synchronized and discretized multichannel signal.

The invention also pertains to a multichannel receiver configured to receive a signal on a plurality of channels and to reject interference. The receiver comprises:

at least two radio chains, for the reception, transposition and discretization of the said signal received on each of the channels of the receiver, so as to obtain a discretized multichannel signal,     computation circuits configured to:

synchronize the said discretized multichannel signal,         compute, on the basis of the discretized and synchronized multichannel signal, a matrix $\hat{R}$ of correlation of the total noise,         compute, on the basis of the said matrix $\hat{R}$ of correlation of the total noise, a vector w comprising amplitude phase weighting coefficients of a multichannel filter, and         apply, to the discretized and synchronized multichannel signal, a multichannel filtering processing on the basis of the said vector w and of a single-channel equalization processing to the filtered signal.

BRIEF DESCRIPTION OF THE DRAWINGS

The invention will be better understood and other characteristics and advantages will become better apparent on reading the nonlimiting description which follows, and by virtue of the appended figures among which.

DETAILED DESCRIPTION

Figure 1A:
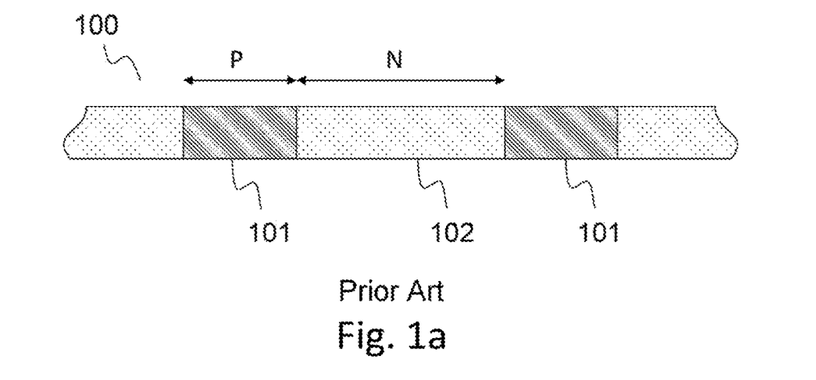
FIG. 1a presents a frame structure making it possible to implement the invention.

FIG. 1a presents the frame structure 100 of a signal making it possible to implement the invention. It applies to any type of mono-carrier signal comprising training sequences 101, consisting of reference symbols known by the sender and the receiver, transmitted in alternation with information sequences 102, consisting of useful symbols, or information symbols. This frame structure is common to most current single-carrier and multicarrier communication standards. The GSM standard, the 3G ($3^{rd}$ generation) standard, the LTE standard (the acronym standing for Long Term Evolution, or 4G), the various DVB standards (the acronym standing for Digital Video Broadcasting), and many others will be cited by way of example.

The purpose of the training sequences is to allow the temporal and frequency synchronization of the receiver, as well as the estimation of the propagation pathway with a view to its compensation by way of an equalizer or of any other suitable technique. Their positions in the frame are known to the receiver.

The length of the training sequences, and their distribution within the signal transmitted, depends on the constraints of implementation of the waveform (such as for example the length of the frames, the maximum displacement speed, the type of propagation pathway, . . . ). Hereinafter in the document, it will be considered that the training sequences are of identical sizes equal to P symbols, and that the data sequences are of identical sizes equal to N symbols. The invention applies in an identical manner when the sizes of the training sequences and of the data sequences vary, or when the training sequences are not all identical.

Figure 1B:
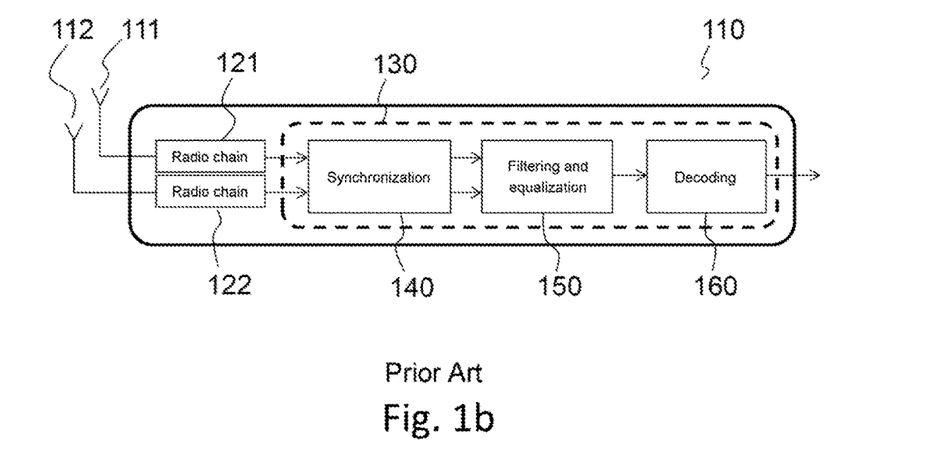
FIG. 1b presents a conventional functional diagram of multichannel receiver in which a multichannel filtering method according to one embodiment of the invention is implemented.

FIG. 1b presents a conventional functional diagram of multichannel receiver in which a multichannel equalization method according to one embodiment of the invention is implemented.

The receiver 110 comprises at least two antennas (or sensors) 111 and 112, intended to receive a signal. Each of the antennas is the input point of one of the channels of the receiver. It also comprises a radio chain 121 and 122 per channel, the object of which is to transform the analogue signal received on carrier frequency into a discretized baseband signal. Accordingly, the radio chain implements means for converting the signal carrier frequency. A conventional embodiment consists in transposing the signal firstly into intermediate frequency, and then in transforming it into equivalent discrete baseband signals by way of a local oscillator, of a phase-shifter and of mixers creating respectively a first channel I in phase and a second channel Q in phase quadrature with the input signal. The signals delivered by the mixers are discretized by analogue-digital converters, or ADCs. Means for filtering the signal in diverse steps of the signal transposition can also be implemented so as to avoid the phenomena of spectral upturns related to the frequency transpositions and to the reductions in the sampling rate. The signal at the radio chain output is a baseband digital signal sampled at a rate greater than the symbol rate of the modulation (generally an integer multiple of the symbol rate).

Downstream of the radio chain, the receiver comprises computation circuits 130 in charge of the execution of all the signal processing algorithms required to ensure good reception of the signal. These computation circuits can take, for example, the form of a reprogrammable computation machine, such as a processor, a DSP (the acronym standing for Digital Signal Processor), or a microcontroller, the form of a dedicated computation machine, such as a set of logic gates like an FPGA (the acronym standing for Field-Programmable Gate Array) or an ASIC (the acronym standing for Application Specific Integrated Circuit), or the form of any other hardware module allowing the execution of computations. They have, or are linked to, a storage space making it possible to store data, such as for example training sequences or matrices during the diverse processings that they carry out.

The computation circuits are in charge of the synchronization 140 of the receiver. The object of the synchronization is to select the best sampling instant, and to measure and compensate the temporal and frequency shifts due to the propagation of the signal. The synchronization is generally carried out by considering the training sequences. The temporal and frequency position of synchronization determined is identical for the whole set of channels. It can be determined by synchronizing each of the channels independently and then by choosing the position offering the best performance, or by a more specific method of multichannel synchronization, such as that described in European patent EP 0665665 B1, the latter solution offering better performance in terms of robustness when faced with noise and with interference. The resulting signal then takes the form of a synchronized multichannel signal, generally sampled at the symbol rate.

The computation circuits are also in charge of the filtering and anti-jammed multichannel equalization 150 of the signal, which constitutes the subject of the invention. This multichannel equalization comprises an anti-jammed multichannel filtering, followed by an equalization of the single-channel signal resulting from the multichannel filtering. The role of the anti-jammed multichannel filtering consists in optimizing the reception of the set of multipaths associated with the useful signal and in removing the undesired interfering signals by generating "voids" in the radiation pattern of the antennas in the direction of the interferences and multi-paths, the spreading of whose delays is outside of the window of the single-channel equalizer placed at output. The length of the window of the single-channel equalizer is an implementational choice, determined as a function of a compromise between the probabilities of occurrence of a propagation pathway whose spreading is greater than this size, and the complexity required for its implementation. The single-channel equalization can be carried out either in the time domain or in the frequency domain.

Finally, the computation circuits are in charge of the set of signal processing algorithms 160 required for reconstructing the useful bits transmitted on the basis of the estimate of the string of emitted symbols. These algorithms are for example algorithms for pathway decoding, for deinterleaving, for decryption, or the like, the choice and the implementation parameters of which depend on the communication standard used. According to the type of algorithm used, the estimated symbols transmitted to the computation circuits may be decided or undecided symbols. They may also be associated with an estimation of the SNR so as to allow or otherwise a Log Likelihood Ratio (LLR) computation.

Hereinafter, the following notation will be used:
A (upper case) designates a matrix,
a (bold) designates a vector,
$\hat{}$ (hat) designates an estimated quantity,
$^H$ designates the transpose-conjugate operator,
E[a] designates the mathematical expectation of a.
P is the length of the training sequences, in number of symbols,
N is the length of the information sequences, in number of symbols,
K designates the number of channels of the receiver,
L is the length of the window of the equalizer, in number of symbols. This window corresponds to the maximum spreading of the paths that are able to be equalized. When the propagation pathway comprises multi-paths whose spreading is greater than this distance L, these paths are seen as interfering signals.
$x_j(n)$ designates the signal received on channel j for symbol n,
x(n) designates the multisensor signal vector received for symbol n, of dimension K,
d(n) designates the signal emitted on the training sequences,
s(n) designates the signal emitted on the information sequences, ŝ(n) designates the signal estimated on the information sequences,
b(n) is a vector of dimension K designating the total reception noise (background noise plus possible interference, plus possible useful multipaths situated outside of the equalization window, that is to say arriving before the first path included in the equalization window or whose delay is greater than L symbols with respect to this first path),
h(n), for n=0, . . . , L−1, is the vector, of dimension K, containing the impulse response of the multisensor useful propagation pathway associated with the paths entering the equalization window,
R designates the autocorrelation matrix of the total reception noise,
$R_{DD}$ designates the autocorrelation matrix of the training signal,
$R_{DX}$ designates the intercorrelation matrix for the cross-correlation between the training signal and the corresponding received signal, and
$R_{XX}$ designates the autocorrelation matrix of the received signal.
We will denote in particular:
d(n)=[d(n), d(n−1), . . . , d(n−L+1)]$^T$ the vector of size L formed on the basis of the training symbols, and
H=[h(0), h(1), . . . , h(L−1)] the multisensor pathway matrix formed on the basis of the vectors h(i) of size (K, L),
as well as the matrices:

$$\hat{R}_{DD} = \frac{1}{P-L+1} \sum_{n=L-1}^{P-1} d(n)d(n)^H, \quad (1)$$

$$\hat{R}_{XD} = \frac{1}{P-L+1} \sum_{n=L-1}^{P-1} x(n)d(n)^H, \quad (2)$$

$$\hat{R}_{XX} = \frac{1}{P-L+1} \sum_{n=L-1}^{P-1} x(n)x(n)^H. \quad (3)$$

The invention therefore applies to a multichannel signal, and follows upon the synchronization step 140.

It relates to the computation of the coefficients which will be used for the multichannel filtering and the equalization of the received signal, and therefore rests in particular on the training sequences.

Figure 2:
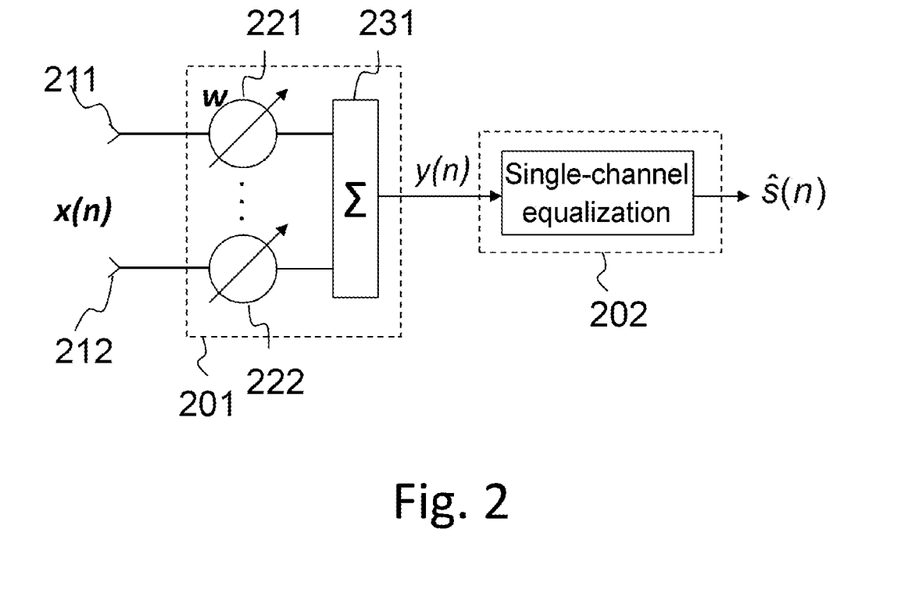
FIG. 2 presents a functional diagram of multichannel antijammed equalizer allowing the implementation of the invention.

FIG. 2 presents a functional diagram of multichannel antijammed equalizer allowing the implementation of the invention.

After synchronization, the signal vector received on the array of sensors may be written:

$$x(n) = \sum_{i=0}^{L-1} e(n-i)h(i) + b(n) \quad (4)$$

with e(n) the signal emitted, equal to d(n) for the training sequences and s(n) for the information sequences.

Denoting by e(n)=[e(n), e(n−1), . . . , e(n−L+1)]$^T$ the vector of size L formed on the basis of the symbols emitted by the useful source, then the above relation can be written x(n)=He(n)+b(n).

The multichannel antijammed equalizer according to the invention comprises a multichannel filtering part 201 and a part 202 carrying out a single-channel equalization. The signal x(n) is received on each of the K channels (in the example two channels 211 and 212 receive respectively $x_1(n)$ and $x_2(n)$). The multichannel filtering part implements a filter with a single complex coefficient per channel (221, 222), which makes it possible to weight the multichannel input signal by an amplitude phase weighting vector w. The signals arising from the weighting with each of the complex coefficients are summed by a summator 231. The single-channel equalization part 202 implements an equalizer charged with recombining the signals arising from the various useful multi-paths, on the basis of an estimate g of the propagation pathway associated with the recombined signal. This estimate g is of finite length L.

If the structure of the antijammed multisensor equalizer is known, the novelty of the invention resides in the computation of the coefficients w.

In patent EP 0867079 B1, the computation of the spatial filter w is done jointly with the computation of a temporal filter v, so as to minimize a mean square error (MSE) criterion on the training sequences:

$$EQM = E(\|w^H x(n) - v^H d(n)\|^2). \tag{5}$$

Two schemes making it possible to compute these coefficients, each one exhibiting advantages and drawbacks, are described in the patent.

The first scheme seeks to optimize the global energy of all the paths received, by computing the spatial filter $\hat{w}$ according to the formula:

$$\hat{w} = \hat{R}_{XX}^{-1} \hat{R}_{DX}^H v. \tag{6}$$

The vector v is obtained by computing the eigenvector associated with the minimum eigenvalue of the matrix B, with $$B = \hat{R}_{DD} - \hat{R}_{DX} \hat{R}_{XX}^{-1} \hat{R}_{DX}^H. \tag{7}$$

The computation of v then requires the decomposition into eigenvalues of the matrix B, which is a matrix of size (L×L). Therefore, the more significant the length of the pathway to be equalized, the more expensive is this decomposition, this rapidly becoming a major limitation for the use of this processing in current communication standards.

The second scheme is aimed at optimizing the energy of the maximum power path. In this scheme, the secondary paths are not "seen", that is to say that the multichannel filtering seeks neither to optimize the gain in the direction of the secondary paths, as in the first scheme, nor to reject them, as in the SMFR.

Accordingly, patent EP 0867079 B1 proposes to compute the spatial filter:

$$\hat{w} = A^{-1} \cdot (r_{xd}(i_0) - \hat{R}_{D'X}^H \hat{R}_{D'D'} r_{D'd}(i_0)) \tag{8}$$

with $$A = \hat{R}_{XX} - \hat{R}_{D'X}^H \hat{R}_{D'D'}^{-1} \hat{R}_{D'X'} \tag{9}$$

$i_0$ being the position associated with the main synchronization spike, $\hat{R}_{D'X}$ and $\hat{R}_{D'D'}$ being the matrices $\hat{R}_{DX}$ and $\hat{R}_{DD}$ obtained by using the vector d'(n) instead of d(n), d'(n) being the vector d(n) stripped of the component $i_0$ and $r_{D'd}(i_0)$ being the correlation product of d'(n) and d(n-$i_0$).

Two inversions are required in order to solve the above equations: the inversion of the matrix A, which is of size (K×K), K being the number of sensors of the receiver, and the inversion of the matrix $\hat{R}_{D'D'}$, of size ((L−1)×(L−1)).

The inversion of the matrix A does not a priori pose any problem, the size of this matrix not being related to the length of the equalized pathway but to the number of sensors, this number hardly being able to attain values such that the inversion of this matrix becomes too constraining.

Concerning the matrix $\hat{R}_{D'D'}$, the latter is computed on the basis of the training sequences. These sequences being known, the inverse of this matrix can be precomputed upstream and stored in memory. This matrix depending on the value of $i_0$, it is necessary to precompute an inverted matrix $\hat{R}_{D'D'}$ for each of the L possible values of $i_0$. The memory space required for the storage of these matrices $\hat{R}_{D'D'}$ therefore equals L×(L−1)×(L−1).

Certain waveforms, in particular military waveforms, seek to guarantee a low probability of interception and of jamming. Accordingly, they take care to reduce to the maximum any sort of radio signature, signature related to the employing of repetitive patterns, which could allow an exterior receiver to characterize the type of communication employed, and which are so many weak points in terms of robustness against jammers, the jamming of the training sequences alone making it impossible to receive the whole of the transmission.

Within the framework of these waveforms, it is therefore customary to provide a large number of different training sequences, known at one and the same time to the sender and to the receiver, and then to select the sequences used in the transmission from among these sequences, making this choice depend on a known parameter of the whole set of players in the transmission, such as for example the time of transmission and an encryption key.

The implementation of the second scheme of patent EP 0867079 B1 then requires the memory storage of M inverted matrices $\hat{R}_{D'D'}$, the size of these matrices then becoming a dimensioning criterion for the receiver (M*L*(L−1)×(L−1)).

The subject of the invention consists in proposing a novel mode of computation of the spatial filter w, making it possible to reduce the memory space occupied, while taking care in respect of the implementational complexity related to the inversion of the matrices, and in improving the performance of the processing.

Accordingly, the invention proposes to consider the column vectors of the matrix $\hat{R}_{XD}$, which are denoted hereinafter $r_{xd}(i)$:

$$\hat{R}_{XD} r_{xd}(0), \ldots, r_{xd}(L-1)]. \tag{10}$$

These vectors constitute estimates of the direction vectors associated with each useful path. Denoting by $i_0$ the position of the path of strongest power, determined during the synchronization phase as the position corresponding to the maximum of the synchronization criterion, $r_{xd}(i_0)$ constitutes an estimate of the direction vector associated with the main path.

In contradistinction to the antijammed schemes according to the prior art implementing the Spatial Matched Filter with Reference (SMFR) defined by the amplitude phase weighting vector of the channels:

$$\hat{w} = \hat{R}_{XX}^{-1} r_{xd}(i_0), \tag{11}$$

the invention implements the spatial matched filter with noise reference only (SMF-NRO) defined by the following vector w:

$$\hat{w} = \hat{R}^{-1} r_{xd}(i_0), \tag{12}$$

with $\hat{R}$ the total-noise correlation matrix, that is to say of the background noise plus possible interferences, and of the noise related to the possible useful multipaths situated outside of the equalization window.

Indeed, the SMFR exhibits the major drawback of processing the useful multipaths which are decorrelated from the path $i_0$ as entirely separate interference (they appear in the correlation matrix $\hat{R}_{XX}$), whilst they could be processed effectively by the single-channel equalizer placed at the output of the spatial part. The consequence is that the SMFR may even lead to lower performance than that of a single-channel equalization processing.

In the method according to the invention of spatial matched filtering with noise reference only, the useful multipaths decorrelated from the path $i_0$ do not appear in the correlation matrix $\hat{R}$: consequently, the SMF-NRO does not seek to reject them, but seeks to reject solely the interferences which cannot be exploited by the single-channel equalizer.

The implementation of the spatial matched filtering according to the invention (SMF-NRO) requires the estimation of the total-noise correlation matrix R, which can be obtained directly on the basis of the estimated matrices $\hat{R}_{XX}$, $\hat{R}_{XD}$ and $\hat{R}_{DD}$ through the formula:

$$\hat{R} = \hat{R}_{XX} - \hat{R}_{XD}\hat{R}_{DD}^{-1}\hat{R}_{XD}^{H}. \quad (13)$$

These computations require only the inversion of the total-noise correlation matrix R, which is of size (K×K), and that of the matrix $R_{DD}$, which is of size (L×L) and which can be computed upstream and stored in memory.

Concerning $\hat{R}$, its size is not dependent on the length of the spread propagation pathway, but on the number of sensors. It is therefore very improbable that this number is high, and its inversion ought not to pose any particular problems.

Concerning $\hat{R}_{DD}$, just like $\hat{R}_{D'D'}$ previously, it can be precomputed on the basis of the training sequences. Since it is a complete matrix, it is necessary to store only a single version of this inverted matrix. Thus, the memory space required is of size (L×L) for the inversion of the matrix $\hat{R}_{DD}$, versus L×(L−1)×(L−1) for the inversion of the matrix $\hat{R}_{D'D'}$ of the prior art. The memory space required for the storage of this matrix therefore decreases by an order of magnitude close to L, this being particularly advantageous when a large number of these matrices have to be stored.

The above equations make it possible to compute the vector $\hat{w}$, which represents the complex weighting factor to be applied to each of the channels of the part corresponding to the spatial filtering 201. The signal y(n) resulting from the spatial filtering of the multichannel signals is therefore a single-channel signal equal to $y(n)=\hat{w}^H x(n)$. This spatial filtering operation makes it possible to remove the jammers and the useful multi-paths situated outside of the window of the equalizer (of size L), and to optimize the gain in the direction of the main path while preserving the various useful paths situated in the window of the equalizer.

When the noise is white temporally, the spatial filtering thus carried out is adapted, that is to say that it makes it possible to maximize the signal-to-noise ratio on the symbol $s(n-i_0)$. However, this operation does not make it possible to remove the inter-symbol interference related to the propagation pathway on the symbols (s(n), s(n−1), . . . , s(n−L+1)). This is the reason why this filtering operation must be followed by a step of single-channel equalization of the signal y(n) to obtain the string of estimated symbols ŝ(n).

The invention stands out from the schemes described in patent EP 0867079 B1 through the following points:

the first mode of computation of the spatial matched filter $\hat{w}$ described in EP 0867079 B1 is suitable when the spatial filtering is followed by a step of single-channel equalization based on an MLSE equalizer. This type of equalizer is efficacious when the length L of the equalization window is small, and when the constellation used has few states. Specifically, this type of equalizer is not suited to current communications standards for which it leads to worse performance and to higher computational power. Moreover, the invention requires the inversion of a matrix of size (K×K), versus the eigenvalue decomposition of a matrix (L×L) for this mode of computation of the EP patent application;

the second mode of computation of the spatial matched filter $\hat{w}$ described in EP 0867079 B1 is suitable when the spatial filtering is followed by a step of single-channel equalization based on an MMSE equalizer. The equalization method according to the invention exhibits performance equivalent to this mode of computation, while being more stable numerically and requiring less memory storage space (of the order of L×L versus L×(L−1)×(L−1) for the EP patent application), thus exhibiting a non-negligible interest, in particular when a large number of training sequences must be stored.

In the method for receiving a multichannel signal according to the invention, the coupling between the part 201 carrying out the spatial filtering of the signals and the part 202 carrying out the single-channel equalization can be carried out in various ways, depending on whether one wishes to optimize the computational power or minimize the interaction between the two parts.

The sequencing of the processings carried out in a single-channel equalizer 202 is the following:

Temporal synchronization of the received signal: the input signal is sampled at the sample rate. This step makes it possible to select the right sampling instant, and to under-sample the signal so as to bring it down to the symbol rate. Advantageously, this step can also comprise a frequency synchronization aimed at removing a frequency shift related to the Doppler effect, to clock drifts, etc. . . .

Estimation of the single-channel propagation pathway,

Equalization properly speaking by any type of single-channel equalizer, such as for example of an MLSE equalizer that can be implemented by way of a suitably matched filtering followed by a Viterbi algorithm, or of an MMSE equalizer, implemented by a transverse equalizer, a decision feedback equalizer (DFE), linear or block-based (BDFE), by an equalization in the frequency domain (FDE), etc. . . .

According to a first embodiment, the part 201 carrying out the multichannel filtering of the signals and the part 202 carrying out the single-channel equalization of the receiver are totally independent. On output from the spatial filtering, the single-channel signal is sampled at the same rate as at input and the single-channel equalizer works in the same manner as if it had to process a single-channel signal directly received on the antenna. This procedure makes it possible to minimize the revamping of code to be performed on the single-channel equalizer when adding a multichannel processing to a single-channel receiver, but is not optimal in terms of computational power required.

According to a second embodiment, the block 140 of the receiver, which carries out the initial multichannel synchronization, is configured to transmit to the multichannel filtering and single-channel equalization block 150 information relating to the optimal synchronization position and the estimated frequency shift. The block 150 then carries out the spatial filtering of the multichannel signal, and is configured to decimate the single-channel signal at the symbol frequency, and optionally to compensate the frequency shift. Thus, the signal exiting the spatial filtering part 201 is synchronized, sampled at the symbol rate, and possibly corrected of an estimated frequency shift. This signal is provided to the single-channel equalizer which does not then have to carry out the step of synchronization and decimation of the signal.

According to a third embodiment, the spatial filtering part decimates the signal at the symbol frequency, and compensates for frequency shifts, in an identical manner to what is done in the second embodiment. On output from the spatial filtering part, the signal is synchronized, sampled at the symbol rate and possibly corrected of an estimated frequency shift. This signal is provided to the single-channel equalizer, as well as an estimate of the single-channel propagation pathway. The single-channel equalizer then performs nothing more than the equalization step properly speaking.

In this third embodiment, the estimate of the propagation pathway is provided to the single-channel equalizer, which uses it to remove the intersymbols interference. This estimate is the propagation pathway vector after spatial filtering, denoted g, of size (1, L), obtained on the basis of an estimation of the multisensor propagation pathway matrix $\hat{H}$, of size (K, L) through the following formula:

$$g = w^H \hat{H} \qquad (14)$$

where $\hat{H}$ is the multisensor pathway matrix estimated directly on the basis of the previously computed matrices:

$$\hat{H} = \hat{R}_{XD} R_{DD}^{-1}. \qquad (15)$$

This embodiment, in which the spatial filtering part and the single-channel equalization part of the multichannel receiver are coupled, is particularly advantageous in terms of implementational complexity. Indeed, the spatial matched filtering with noise reference only then exhibits reduced complexity with respect to the prior art, but also makes it possible to reduce the complexity of the processings operated downstream during the single-channel equalization of the signal.

The invention also proposes a second avenue of improvement of the prior art, which relates to the determination of the value of the position $i_0$, used for the computation of the vector $\hat{w}$ used by the spatial matched filter. A way of determining this value is given in patent EP 0867079 B1, and consists in choosing $i_0$ as being the position of the path of strongest power, this position being determined during the synchronization phase preceding the computation of the coefficients of the spatial filter.

In the presence of multi-paths, this position is not necessarily optimal. Indeed, the synchronization does not take into account the existence of an equalization algorithm positioned further on in the processing chain. Thus, the synchronization is aimed at selecting the strongest path, by considering the set of other paths to be jammers, for the purpose of "pointing" the spatial filter in the direction of this path.

The invention proposes to choose $i_0$ during the step of computing the vector w. The computation can then be carried out on the basis of the total-noise autocorrelation matrix $\hat{R}$, which comprises solely the Gaussian white noise and the set of paths that are situated outside of the window of the equalizer. The position chosen by using this matrix will therefore be that which will maximize the rejection of these jammers, in contradistinction to the prior art, in which the set of multiple paths, be they situated in or outside the window of the equalizer, are considered to be jammers.

The position $i_0$ therefore corresponds to the position which maximizes the SNIR at the output of the spatial filter, and is determined according to the formula:

$$i_0 = \text{ArgMax}_i \{ \text{SNIR}(i) = \hat{r}_{xd}(i)^H \hat{R}^{-1} \hat{r}_{xd}(i) \}. \qquad (16)$$

Finally, the invention proposes a third avenue of improvement with respect to the prior art, which consists in extending the proposed spatial filtering structure by affording it an additional temporal component.

Figure 3:
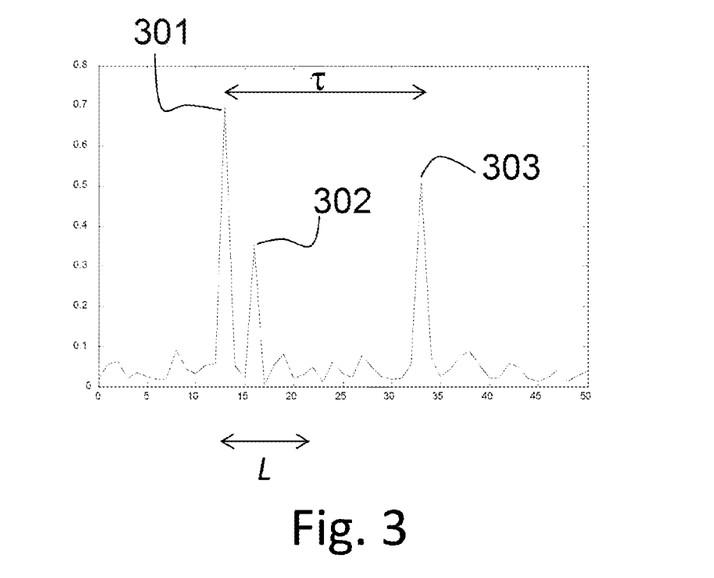
FIG. 3 represents an exemplary result obtained by correlation between a received signal and a training sequence.

FIG. 3 represents an exemplary result obtained by correlation between a received signal and a training sequence. The abscissa axis is a time axis graduated in symbol times, while the ordinate axis gives the modulus of the correlation.

In this example, three multi-paths 301, 302 and 303 are observed. The first path 301 is the strongest path. The second path 302 is a path of weaker power, its disparity with respect to the first path allows it to be taken into account by an equalizer of length L positioned on the first path. The third path 303 is a distance $\tau$ away, greater than the length of the window of the equalizer. By positioning the synchronization on the first path, the third will be outside of the horizon of the equalizer, and will be considered to be a jammer.

The addition of an additional temporal dimension to the antenna filtering makes it possible to recombine this signal with the useful signals, and therefore to take it into account, thus improving the signal-to-noise ratio, reducing the intersymbol interference, and therefore thus improving the performance of the receiver.

Figure 4:
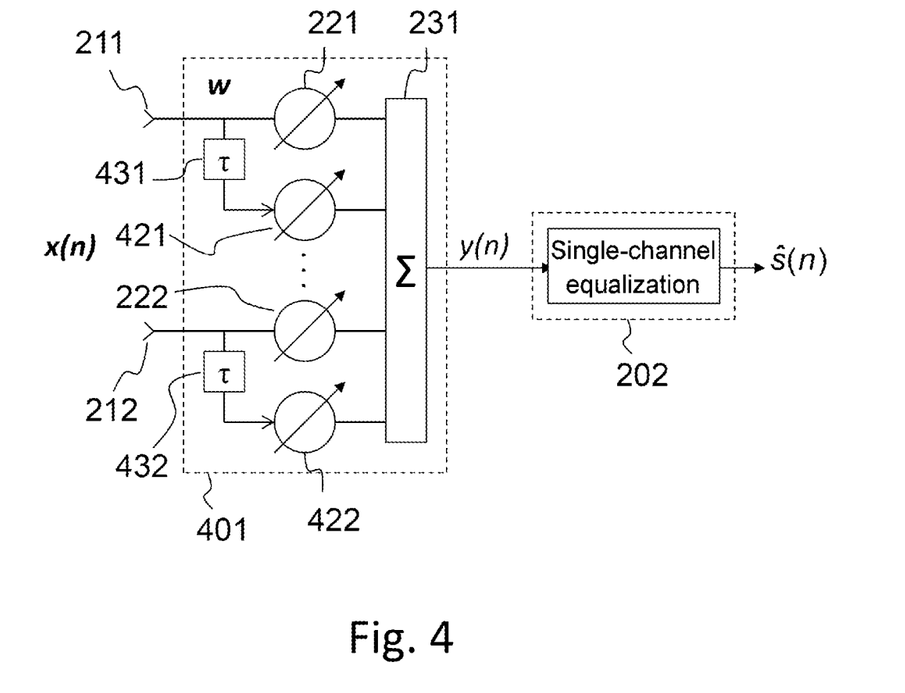
FIG. 4 presents a functional diagram of multichannel antijammed equalizer according to another embodiment of the invention, in which the spatial filtering part comprises an additional temporal dimension with respect to the prior art.

FIG. 4 presents a functional diagram of multichannel antijammed equalizer according to another embodiment of the invention, in which the multichannel filtering part comprises an additional temporal dimension with respect to the prior art. One then speaks of spatio-temporal filtering.

In this example, the architecture of the multichannel antijammed equalizer is such that it is able to process only a single additional path. The person skilled in the art wishing to extend this structure to more than one path could very easily achieve same on the basis of the teachings given hereinafter.

The multichannel equalizer such as defined by the invention is based on the multichannel filtering structure of FIG. 2, whose part 401 dedicated to the spatial filtering is modified by the addition, for each of the input channels 211 and 212, of an additional branch comprising a delay line 431 and 432, and a filter with a complex coefficient 421 and 422. Additional paths can be taken into account by adding an additional branch on each of the input channels per additional path.

The delay lines 431 and 432 introduce a delay $\tau$ corresponding to the disparity between the synchronization position and the path that must be taken into account. In the example presented in FIG. 3, this delay corresponds to the disparity between the path 301 and the path 303. The additional path taken into account could also be the path 302, so as to reset it in phase with the main path upstream of the equalizer. In practice, the paths on which the adaptation is carried out are chosen during the initial multichannel synchronization step.

The spatio-temporal filtering presented preserves the spatial-filtering interference rejection capacity presented in FIG. 2 and its optimality for non-spread pathways (propagation in free space and flat fading), and improves it when the useful propagation pathway is frequency selective, by resetting in phase the secondary paths selected between the various channels. This phase resetting can also be applied to the multiple paths exiting the horizon of the equalizer, this exhibiting an interest in the case of propagation pathways whose temporal spreading may be greater than the horizon of the equalizer. An interesting case of application relates to aircraft, for which the use of an equalizer is desirable in order to take account of the multi-paths related to the reflections on the cabin or the neighbouring buildings when the aircraft is on the ground (delays typically less than 5 or indeed 10 µs), but may turn out to be very expensive when it entails taking account of delays related to ground reflection when the aeroplane is at altitude (delays of perhaps greater than 20 µs for two aeroplanes at high altitudes). The spatio-temporal filtering proposed by the invention affords a solution making it possible to take account of these off-horizon paths of the equalizer in receivers whose single-channel equalizer is not dimensioned to process such paths.

The spatio-temporal filtering structure described is compatible with the various types of waveform comprising reference sequences.

The coefficients w of the spatio-frequency part of this embodiment can be computed in an identical manner to those presented previously, on replacing the vectors x(n) and w by their spatio-temporal equivalents:

$$\tilde{x}(n) = \begin{bmatrix} x(n) \\ x(n+\tau) \end{bmatrix} = [x_1(n), x_2(n), x_1(n+\tau), x_2(n+\tau)]^T \quad (17)$$

and $$\tilde{w} = \begin{bmatrix} w_1 \\ w_2 \end{bmatrix}, \quad (18)$$

with $w_1$ the coefficients determined on the basis of the undelayed path, and $w_2$ the coefficients determined on the basis of the additional path delayed by $\tau$.

The output signal of the spatio-temporal filter, after summation, may be written:

$$y(n) = \tilde{w}^H \tilde{x}(n) = w_1^H x(n) + w_2^H x(n+\tau) \quad (19)$$

and is provided to the single-channel equalizer suitably matched to the waveform considered.

Another advantage afforded by the spatio-temporal filtering structure such as described in the invention resides in the capacity to correct the defects of mispairing between the reception channels.

Indeed, the receiver's reception chains are generally imperfect, that is to say that not all the reception channels are exactly identical. These imperfections are due mainly to the variations specific to the analogue hardware components. The antenna filtering processings make the assumption that the signals received on each of the sensors are processed in an identical manner by the radio chains. The imperfections of the hardware components then create variations in the band of the signal which degrade the performance of these processings.

When the antenna filtering exhibits solely a spatial component (see FIG. 2), its frequency response is flat in the band of the signal. The spatial filtering cannot therefore compensate for the mispairing-related frequency variations of the signal. Conversely, the introduction of an additional temporal notion to this antenna filtering processing (FIG. 4) allows the filter to afford a frequency response, and therefore to compensate for the variations related to mispairings.

The invention therefore pertains to a method of multichannel equalization in a receiver, the equalization comprising a spatial or spatio-temporal multichannel filtering part coupled to a single-channel equalization part, as well as in the receiver configured to implement this method.

Figure 5:
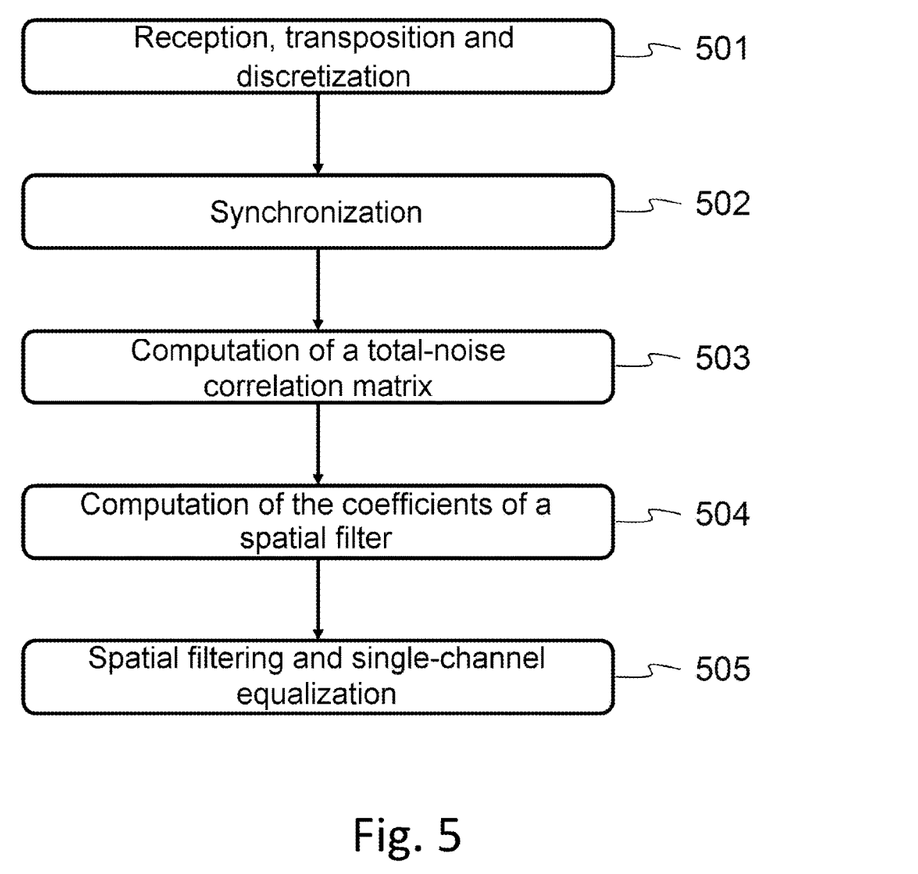
FIG. 5 is a representation in the form of a state chart of the steps of an embodiment of the method according to the invention.

FIG. 5 is a representation in the form of a state chart of the steps of an embodiment of the method according to the invention, when the envisaged multichannel filtering structure is that represented in FIG. 2.

The first step 501 of the method consists of the reception of the signal, the signal comprising training sequences and data sequences, on a plurality of sensors, or antennas. It also comprises the set of processings culminating in the digitization of the signal, namely in particular the transposition of the signal to baseband and the associated filterings and the analogue-digital conversion.

The second step 502 of the method consists of the temporal and frequency synchronization of the multichannel signal received, this step being able advantageously to be carried out by means of a multichannel synchronization algorithm. The object of the synchronization is to find the sampling instant making it possible to optimize the reception of the signal, and to determine the position in the received signal of the training sequences and of the data sequences. The synchronization can also comprise a frequency synchronization of the signals, aimed at compensating for a shift between the clocks of the transmit and receive equipment.

The third step 503 of the method consists in computing, on the basis of the training sequences of the signal received on the set of channels of the receiver, a matrix $\hat{R}$ of correlation of the total noise received, the computation of this matrix being able advantageously to be done on the basis of the formula:

$$\hat{R} = \hat{R}_{XX} - \hat{R}_{XD} \hat{R}_{DD}^{-1} \hat{R}_{XD}^H. \quad (20)$$

In particular, this computation requires the inversion of a matrix $R_{DD}$ of autocorrelation of the training sequence on which the estimate of the coefficients of the spatio-temporal equalizer is made. In order to limit the computational burden, this inverse matrix can advantageously be stored in a memory of the multichannel receiver according to the invention.

The fourth step 504 of the method consists in computing, on the basis of the matrix $\hat{R}$ and of a value $r_{xd}(i_0)$, the vector w containing the complex coefficients that must be applied by the receiver during the multichannel filtering step. In this case, the multichannel filtering is a spatial filtering. The value $r_{xd}(i_0)$ is the mathematical expectation of the correlation between a training sequence and the multichannel signal received affected with a delay $i_0$. This delay $i_0$ can be selected as being the delay between the synchronization position and the position of the signal of strongest power, or else the position which maximizes the SINR on output from the spatial processing.

The fifth step 505 of the method consists in applying the multichannel spatial filtering computed to the received signal, to obtain a single-channel signal, and then in equalizing this signal so as to remove the residual inter-symbol interference.

On completion of the spatial filtering, the signal is a single-channel signal that may be written $y(n) = \hat{w}(n)^H x(n)$, and whose interferences and multiple paths situated outside of the window of the single-channel equalizer have been attenuated. The object of the single-channel equalization which follows the filtering is to exploit the set of residual multiple paths contained in the equalization window to remove the interferences between symbols.

The method according to the invention therefore makes it possible to compute the coefficients of the vectors that must be used by the spatial filtering part and by the single-channel equalization part of a spatio-temporal equalizer so as to combat the interference.

Steps 501 to 504 of the method are carried out on the basis of the training sequences received, these sequences then being known to the receiver. The computations can be carried out for each training sequence. The processing is then suitable for following the fast variations of the propagation pathway. They can also be carried out for each training sequence, and combined together, so as to smooth the noise-related computation errors.

Step 505 is applied to the useful data sequences. The equalized and spatially filtered useful symbols which result therefrom can thereafter be processed by the signal processing algorithms as a function of the communication standard used, in such a way as to reconstruct the useful bits transmitted.

According to one embodiment, the multichannel filtering block according to the invention furthermore comprises a temporal dimension on each of the reception channels: the multichannel filtering of the input signals is carried out by a spatio-temporal structure.

Figure 6:
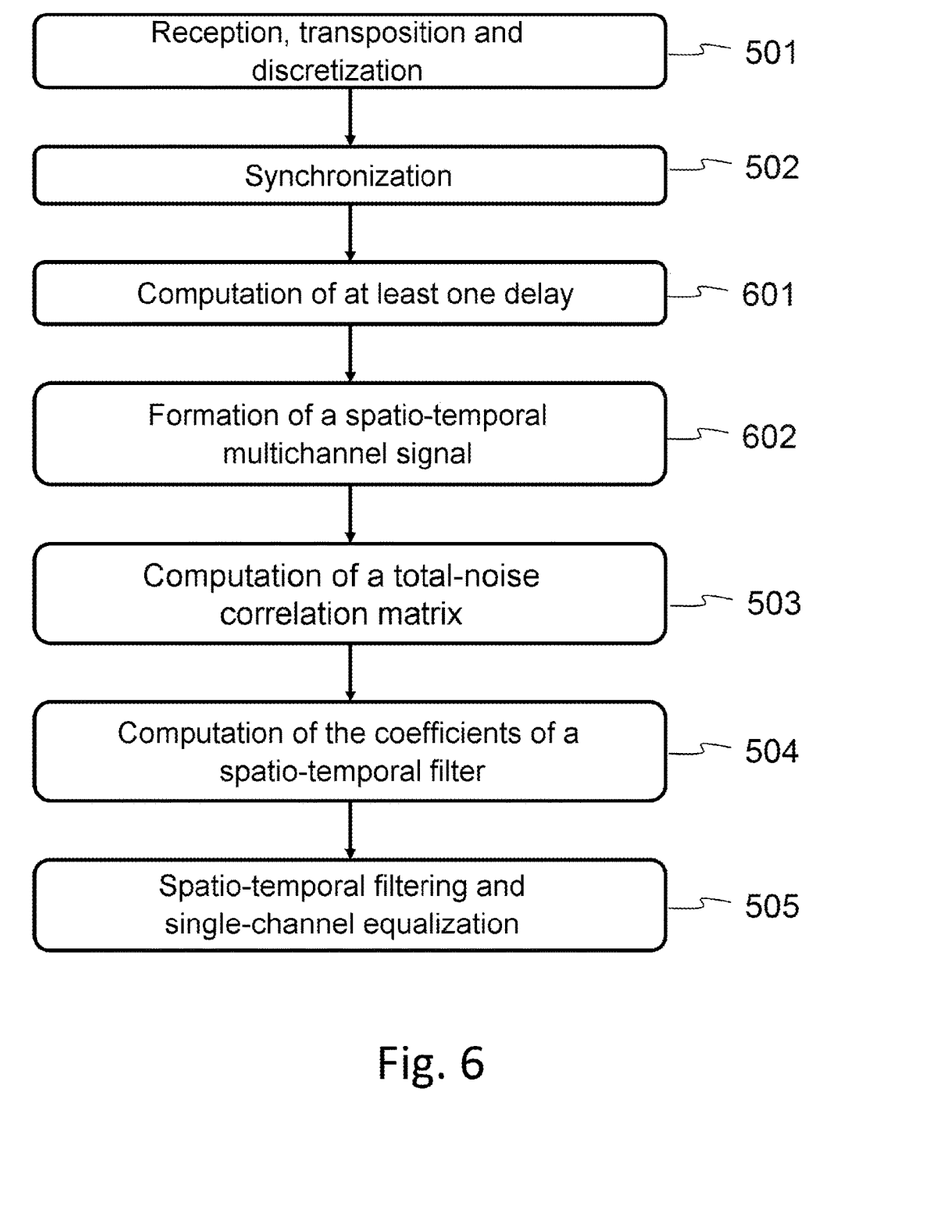
FIG. 6 is a representation in the form of a state chart of the steps of an embodiment of the method according to the invention.

FIG. 6 is a representation in the form of a state chart of the steps of an embodiment of the method according to the invention, when the structure of the envisaged multichannel filtering block is that represented in FIG. 4, for which the filtering of the input signals is carried out by a spatio-temporal structure.

Thus, the method comprises, in addition to steps 501 and 502 of reception, transposition and discretization of the signal and of multichannel synchronization, a step 601 of determining at least one delay ($\tau_1, \tau_2, \ldots, \tau_N$) between the synchronization position and one or more paths of the received signal. This or these delays are advantageously estimated jointly with the step 502 of synchronization on the basis of the function for the correlation between the received signal and the training sequences.

A step 602 consists in delaying each of the channels of the receiver by the computed delay or delays and in forming a multichannel signal vector on the basis of the discretized and synchronized multichannel signal received x(n), and of the delayed versions of this same signal:

$$\tilde{x}(n) = \begin{bmatrix} x(n) \\ x(n+\tau_1) \\ \ldots \\ x(n+\tau_N) \end{bmatrix}. \quad (21)$$

The following steps of the method are identical to those of the method of FIG. 5, except that they use the signal $\tilde{x}(n)$ instead of $x(n)$.

Thus, step 503 of computing the total-noise correlation matrix $\hat{R}$ is done on the basis of the signal $\tilde{x}(n)$. This step comprises the computation of the matrices $\hat{R}_{XX}$ and $\hat{R}_{XD}$ formed on the basis of the spatio-temporal signal $\tilde{x}(n)$.

The computation 504 of the vector w is carried out on the basis of $\hat{R}$, w constituting the spatio-temporal filter that must be applied to the multichannel signal $\tilde{x}(n)$.

Finally, the method comprises step 505 of multichannel filtering on the basis of the vector w, but this step is applied to the signal $\tilde{x}(n)$. It then entails a spatio-temporal filtering, the resulting single-channel signal having thereafter to be processed by a single-channel equalizer.

The invention claimed is:

1. A method for receiving a signal and for rejecting interference in a multichannel receiver, the said method comprising the steps of: reception, transposition and discretization of the said signal received on each of the channels of a receiver, so as to obtain a discretized multichannel signal, synchronization of the discretized multichannel signal, and further comprising the steps of:
computation, on the basis of the discretized and synchronized multichannel signal, of a matrix $\hat{R}$ of correlation of the total noise,
computation of a matrix $\hat{R}_{XD}$ of intercorrelation between a training sequence and the discretized and synchronized multichannel signal received,
computation, on the basis of the matrix $\hat{R}_{XD}$, of an estimate of a director vector associated to one path,
computation, on the basis of the said matrix $\hat{R}$ of correlation of the total noise and of the estimate of the director vector associated to one path, of a vector w comprising amplitude phase weighting coefficients of a multichannel filter, and
application, to the discretized and synchronized multichannel signal, of a multichannel filtering processing on the basis of the said vector w, and then of a single-channel equalization processing to the filtered signal.

2. The method for receiving a signal and for rejecting interference according to claim 1, wherein the computation of the matrix $\hat{R}$ of correlation of the total noise received on the set of channels of the receiver is carried out on the basis:
of a matrix $\hat{R}_{XX}$ of autocorrelation of the discretized and synchronized multichannel signal received,
of a matrix $\hat{R}_{DD}$ of autocorrelation of the said training sequence,
according to the formula:

$$\hat{R} = \hat{R}_{XX} - \hat{R}_{XD}{}^H \hat{R}_{DD}{}^{-1} \hat{R}_{DX}.$$

3. The method for receiving a signal and for rejecting interference according to claim 2, wherein the inverse of the matrix $\hat{R}_{DD}$ is pre-computed and stored in a memory of the multichannel receiver.

4. The method for receiving a signal and for rejecting interference according to claim 1, wherein the computation of the vector w comprising amplitude phase weighting coefficients to be applied to each of the channels in the multichannel filtering part (201) comprises:
the computation of $r_{xd}(i_0)$, $r_{xd}(i_0)$ being the mathematical expectation of the correlation between a training sequence and the multichannel signal received affected with a delay $i_0$,
the computation of $\hat{w}$ according to the formula $\hat{w} = \hat{R}^{-1} r_{xd}(i_0)$.

5. The method for receiving a signal and for rejecting interference according to claim 4, wherein the delay $i_0$ is determined with respect to the position of the path of strongest power.

6. The method for receiving a signal and for rejecting interference according to claim 4, wherein the delay $i_0$ is determined with respect to the position which maximizes the signal-to-noise plus interference ratio at the output of the multichannel filtering.

7. The method for receiving a signal and for rejecting interference according to claim 6, wherein the position which maximizes the signal-to-noise plus interference ratio is obtained through the formula:

$$i_0 = \text{ArgMax}_i \{ \text{SNIR}(i) = \hat{r}_{xd}(i)^H \hat{R}^{-1} \hat{r}(i) \}.$$

8. The method for receiving a signal and for rejecting interference according to claim 1, wherein the said single-channel equalization is carried out on the basis of an estimation of the single-channel propagation pathway g given by the formula $g=w^H \hat{H}$ where $\hat{H}$ is a multisensor pathway matrix estimated according to the formula $\hat{H}=\hat{R}_{XD}R_{DD}^{-1}$.

9. The method for receiving a signal and for rejecting interference according to claim 1, wherein the said multichannel filtering is a spatial filtering.

10. The method for receiving a signal and for rejecting interference according to claim 1, wherein the said multichannel filtering is a spatio-temporal filtering, the method furthermore comprising a step of determining at least one delay $\tau_j$ associated with a multiple path of the signal received, and a step of forming a spatio-temporal multichannel signal vector on the basis of the said discretized and synchronized signal and of the said discretized and synchronized signal delayed by the said delay or delays $\tau_j$, steps of computing a matrix $\hat{R}$ of correlation of the total noise, and of applying a multichannel filtering processing taking the said spatio-temporal multichannel signal as synchronized and discretized multichannel signal.

11. A multichannel receiver configured to receive a signal on a plurality of channels and to reject interference, comprising:

at least two radio chains, for the reception, transposition and discretization of the said signal received on each of the channels of a receiver, so as to obtain a discretized multichannel signal, and computation circuits configured to synchronize the said discretized multichannel signal, wherein the computation circuits are further configured to:

compute, on the basis of the discretized and synchronized multichannel signal, a matrix $\hat{R}$ of correlation of the total noise, compute a matrix $\hat{R}_{XD}$ of intercorrelation between a training sequence and the discretized and synchronized multichannel signal received, compute, on the basis of the matrix $\hat{R}_{XD}$, of an estimate of a director vector associated to one path, compute, on the basis of the said matrix $\hat{R}$ of correlation of the total noise and of the estimate of the director vector associated to one path, a vector w comprising amplitude phase weighting coefficients of a multichannel filter, and apply, to the discretized and synchronized multichannel signal, a multichannel filtering processing on the basis of the said vector a and of a single-channel equalization processing to the filtered signal.

* * * * *